US008515761B2

(12) United States Patent
Agrawal et al.

(10) Patent No.: US 8,515,761 B2
(45) Date of Patent: Aug. 20, 2013

(54) INTELLIGENT MECHANISM TO AUTOMATICALLY DISCOVER AND NOTIFY A POTENTIAL PARTICIPANT OF A TELECONFERENCE

(75) Inventors: Kavita Agrawal, Austin, TX (US);
William K. Bodin, Austin, TX (US);
Lakshmi N. Potluri, Austin, TX (US);
Gregory W. Rybczynski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 12/259,783

(22) Filed: Oct. 28, 2008

(65) Prior Publication Data

US 2010/0106504 A1    Apr. 29, 2010

(51) Int. Cl.
*G10L 11/00* (2006.01)
(52) U.S. Cl.
USPC ............ 704/270; 704/231; 704/235; 704/275
(58) Field of Classification Search
USPC .............. 704/270, 275, 231, 235; 379/93.21, 379/158, 202.01–206.01
See application file for complete search history.

(56) References Cited

U.S. PATENT DOCUMENTS

| | | | |
|---|---|---|---|
| 2004/0030753 A1* | 2/2004 | Horvitz | 709/206 |
| 2004/0172255 A1* | 9/2004 | Aoki et al. | 704/275 |
| 2006/0193459 A1* | 8/2006 | Cadiz et al. | 379/211.02 |
| 2006/0282264 A1* | 12/2006 | Denny et al. | 704/233 |
| 2007/0036320 A1* | 2/2007 | Mandalia et al. | 379/210.01 |
| 2007/0172045 A1* | 7/2007 | Nguyen et al. | 379/202.01 |
| 2007/0274233 A1* | 11/2007 | Ptashek et al. | 370/254 |
| 2008/0037745 A1* | 2/2008 | Ramamoorthy et al. | 379/201.01 |
| 2008/0075255 A1* | 3/2008 | Nguyen et al. | 379/202.01 |
| 2008/0084984 A1* | 4/2008 | Levy et al. | 379/202.01 |
| 2008/0137831 A1* | 6/2008 | Khorsandi | 379/202.01 |
| 2008/0247528 A1* | 10/2008 | Charish | 379/202.01 |
| 2009/0016513 A1* | 1/2009 | Miller et al. | 379/202.01 |
| 2009/0220065 A1* | 9/2009 | Ahuja et al. | 379/202.01 |
| 2010/0034366 A1* | 2/2010 | Basson et al. | 379/202.01 |

\* cited by examiner

*Primary Examiner* — Douglas Godbold
(74) *Attorney, Agent, or Firm* — Yee & Associates, P.C.; Yenn Tham

(57) ABSTRACT

A computer-implemented method, computer program product, and data processing system for notifying an identified person of a teleconference. Data corresponding to an audio record of the teleconference is received. Pattern recognition is performed on the data. Responsive to recognizing in the data a pattern corresponding to an identification of the identified person, a device associated with the identified person is contacted.

13 Claims, 4 Drawing Sheets

INTELLIGENT MECHANISM TO AUTOMATICALLY DISCOVER AND NOTIFY A POTENTIAL PARTICIPANT OF A TELECONFERENCE

BACKGROUND

1. Technical Field

The present invention provides for an improved method of communication. In particular, the present invention provides for an improved method computer program product and data processing system for contacting individuals mentioned or identified during a live teleconference.

2. Description of the Related Art

During teleconferences or other meetings, mention may be made of individuals that are not present at the teleconference or meeting. In some cases, attendance of these identified individuals would be useful, desirable, or necessary. These identified individuals can be described as identified persons. The term "identified person" does not necessarily imply that the person is, key, necessary, or somehow critical to the meeting.

Currently, the only method of notifying an identified person that their attendance is desired or required is for one of the attendees, or some other person, to contact the identified person so that the identified person can join the teleconference. However, this method of contacting the identified person is relatively inefficient, and possibly disruptive of the teleconference.

BRIEF SUMMARY

The illustrative embodiments of the present invention provide for a computer-implemented method, computer program product, and data processing system for notifying an identified person of a teleconference. Data corresponding to an audio record of the teleconference is received. Pattern recognition is performed on the data. Responsive to recognizing in the data a pattern corresponding to an identification of the identified person, a device associated with the identified person is contacted.

BRIEF DESCRIPTION OF THE DRAWINGS

The novel features believed characteristic of the illustrative embodiments are set forth in the appended claims. The illustrative embodiments, themselves, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
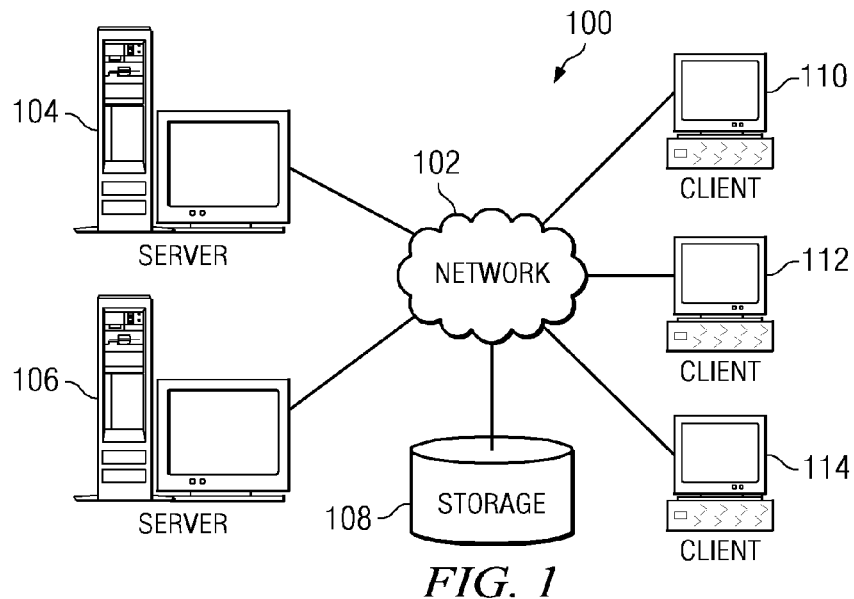
FIG. 1 is a block diagram of a network of data processing systems, in which the illustrative embodiments of the present invention may be implemented.
Figure 2:
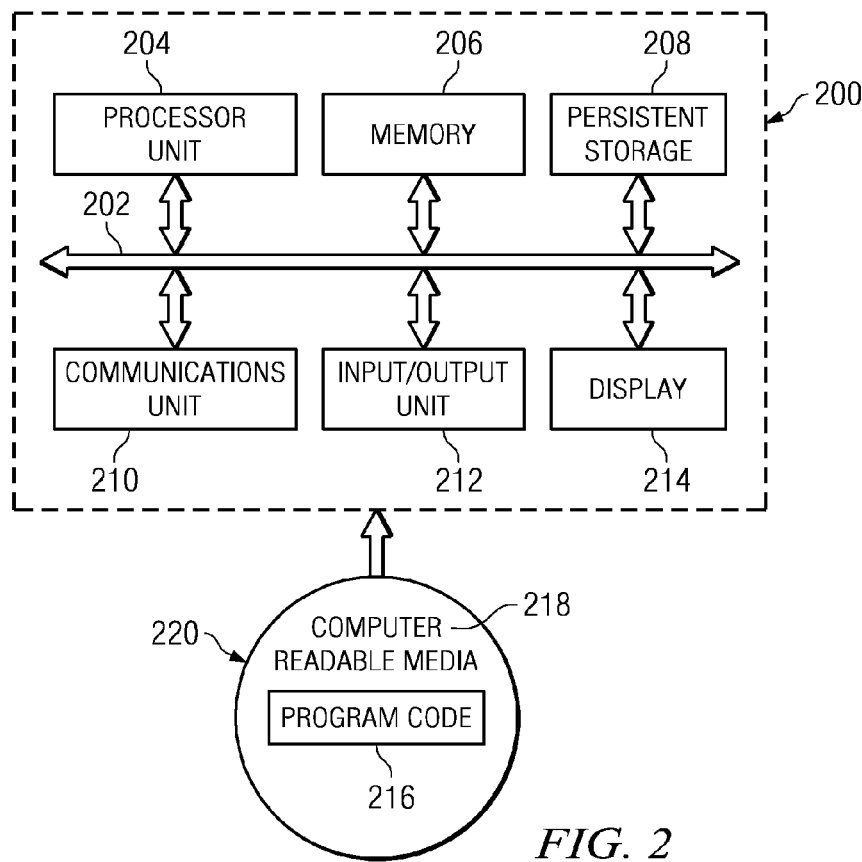
FIG. 2 is a block diagram of a data processing system, in which illustrative embodiments of the present invention may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a block diagram of a network of data processing systems, in which the illustrative embodiments of the present invention may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is a block diagram of a data processing system, in which illustrative embodiments of the present invention may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments of the present invention provide for a computer implemented method, a computer program product, and data processing system for notifying an identified person of the teleconference. Data corresponding to an audio record of the teleconference is received. Pattern recognition is performed on the data. Responsive to recognizing in the data a pattern corresponding to an identification of the identified person, a device associated with the identified person is contacted. A response from the device is received. Thus, the illustrative embodiments of the present invention provide for a method of automatically identifying and then notifying an identified person.

Figure 3:
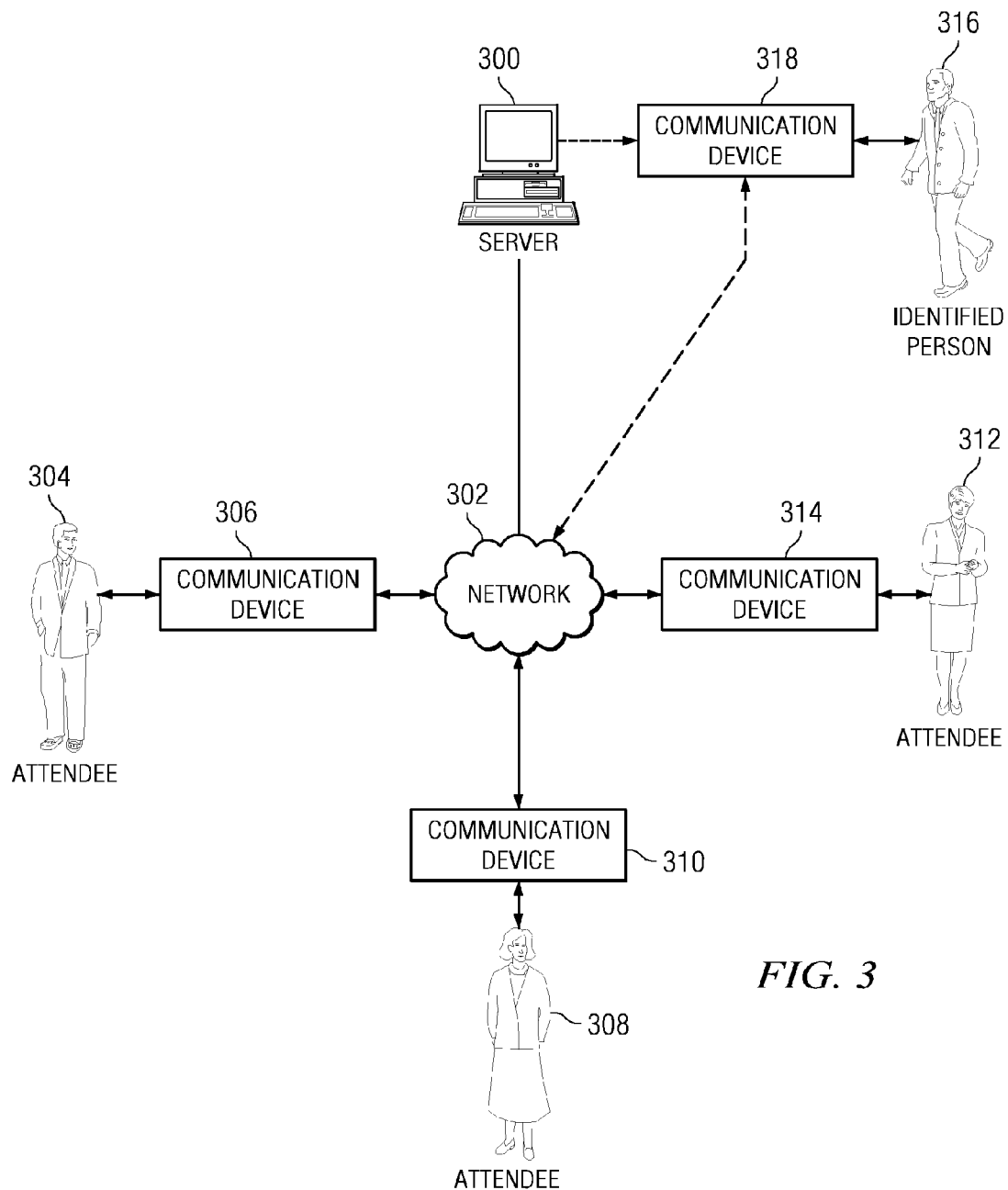
FIG. 3 is a block diagram of a teleconference, in accordance with an illustrative embodiment of the present invention.

In the illustrative example shown in FIG. 3, several attendees are participating in a telephone conference via network 302. Network 302 can be network 102 described in FIG. 1. The teleconference shown in FIG. 3 can be implemented via a server, such as server 300. Server 300 can be, for example, server 104 or server 106 shown in FIG. 1.

In this illustrative example, attendee 304 is participating in the teleconference via communication device 306, attendee 308 is attending the teleconference via communication device 310, and attendee 312 is attending the teleconference via communication device 314. During the teleconference, the name or other identification of identified person 316 is spoken allowed. Other identification can be an employee identification number, social security number, or any other form of identification. Alternatively, the name or identification of identified person 316, can be input via any one of communication device 306, communication device 310, or communication device 314, and thence communicated via network 302 to server 300.

In this particular illustrative example, the name of identified person 316 is spoken aloud. Speech pattern recognition software executing on server 300, which is monitoring the teleconference, recognizes the name of identified person 316. As a result, server 300 contacts communication device 318, which is associated with identified person 316.

A communication device is associated with identified person 316 if that communication device is assigned to identified person 316, is owned by identified person 316, or is otherwise associated with or used by identified person 316. Communication device 318 can take many forms. For example, communication device 318 can be a data processing system executing an instant messaging system. Similarly, communication device 318 can be a data processing system executing an email program. In this case, the notification takes the form of an email. Communication device 318 can also be a mobile communication device, such as a cell phone or other mobile communication device. In this case, the notification can take the form of a text message, or an actual phone call with an audio recording informing identified person 316 that identified person 316 is desired or required in the teleconference.

At this point, identified person 316 can respond to the notification in many ways. In an illustrative example, communication device 318 is a mobile phone. In this case, identified person 316 can dial into network 302 in order to join the teleconference. The phone number associated with the teleconference can be transmitted via the recorded phone message sent to identified person 316, the text message, the email, or the instant message sent to identified person 316.

In another illustrative embodiment of the present invention, identified person 316 can respond by sending an email, instant message, text message, or voice message to server 300. Server 300 can then forward the response to any one or all of the attendees, or possibly to a third party. In this case, the response can take many different formats, such as an indication that identified person 316 will attend shortly, will not attend the meeting, or will be able to attend late. Additionally, the response can possibly take the form of more complex communications, such as instructions regarding a particular project, answers to questions posed by any one of attendee 304, attendee 308, or attendee 312, or possibly other messages. In an illustrative embodiment of the present invention, identified person 316 can respond to the notification by pressing a button on communication device 318 in order to send a tone to server 300. Server 300 can recognize different tones as corresponding to different responses. For example, tones can be provided for indicating that the identified person will join shortly, that the identified person cannot attend, that the identified person will be late, or possibly other predetermined responses.

The illustrative process described with respect to FIG. 3 can be further modified. For example, if the name of identified person 316 is mentioned more than a predetermined number of times, then the notification system may try to contact the member via different methods in a particular priority. For example, server 300 could first attempt to contact identified person 316 via instant message and, failing that, attempt to contact identified person 316 via email and, failing that, attempt to communication with person 316 via a text message and, failing that, attempt to communicate with identified person 316 via a phone call to a mobile communication device associated with identified person 316. The order of these attempts can be varied. Server 300 can also attempt to communicate with identified person 316 via different methods, possibly in a predetermined priority as soon as the name of identified person 316, or other identification, is mentioned or input.

In another illustrative embodiment, tagging information can be added to a recording of the teleconference such that the teleconference can be integrated and converted into a podcast. Thus, the illustrative embodiments of the present invention can be used to convert the audio recording of the teleconference into data, save the data, and then transmit the data to a mobile communication device or other data processing system associated with identified person 316. In this case, identified person 316 can use communication device 318 to listen to the teleconference in real time, whether or not identified person 316 can respond or communicate with the other attendees of the teleconference.

Additional tags or tagging information can be used to activate the illustrative embodiments of the present invention; that is, to specify whether or when an identified person will be contacted. For example, if the tag, tag name, or other identifier is not spoken aloud during the teleconference, then mention of the name or other identifier of the identified person will not result in that identified person being contacted. However, if the tag is spoken out loud, then the pattern recognition software will recognize the tag has been spoken. As a result, the feature of contacting the identified person (or possibly multiple identified persons) will be activated. In this manner, accidental notification of an identified person can be avoided, if not desired.

Similarly, server 300 can use the speech pattern recognition software to convert an audio recording of the teleconference into text format. The transcribed teleconference can then be transmitted to communication device 318 of identified person 316.

In another illustrative embodiment, pattern recognition software on server 300 can be triggered to execute based on a rules mechanism. For example any one of attendee 304, attendee 308, or attendee 312 could send a message to server 300 to cause server 300 to begin speech pattern recognition. Alternatively, identified person 316 can independently cause server 300 to begin speech pattern recognition on predetermined or known teleconferences. Note that server 300 stores or has access to contact information for identified person 316.

The illustrative embodiments can also be expanded to include multiple identified persons. In addition, the illustrative embodiments of the present invention can be expanded to allow different access rights of different identified persons based on the identity of those identified persons, based upon predetermined rules, or based upon rules specified by any one of attendee 304, attendee 308, or attendee 312.

Thus, the illustrative embodiments shown in FIG. 3 provide for a method where individuals who are not on a teleconference, but wish to participate in the teleconference, can contribute to a teleconference or otherwise monitor a teleconference. In particular, a user can be notified if the user's name is mentioned or input during a teleconference, or possibly during a face-to-face meeting that is monitored by server 300.

In an illustrative example, an identified person who wishes to keep track of one or more teleconferences can subscribe to a service. Based on this subscription, an alert can be sent to the identified person when the name or identification of the identification is mentioned or input during the one or more teleconferences.

Figure 4:
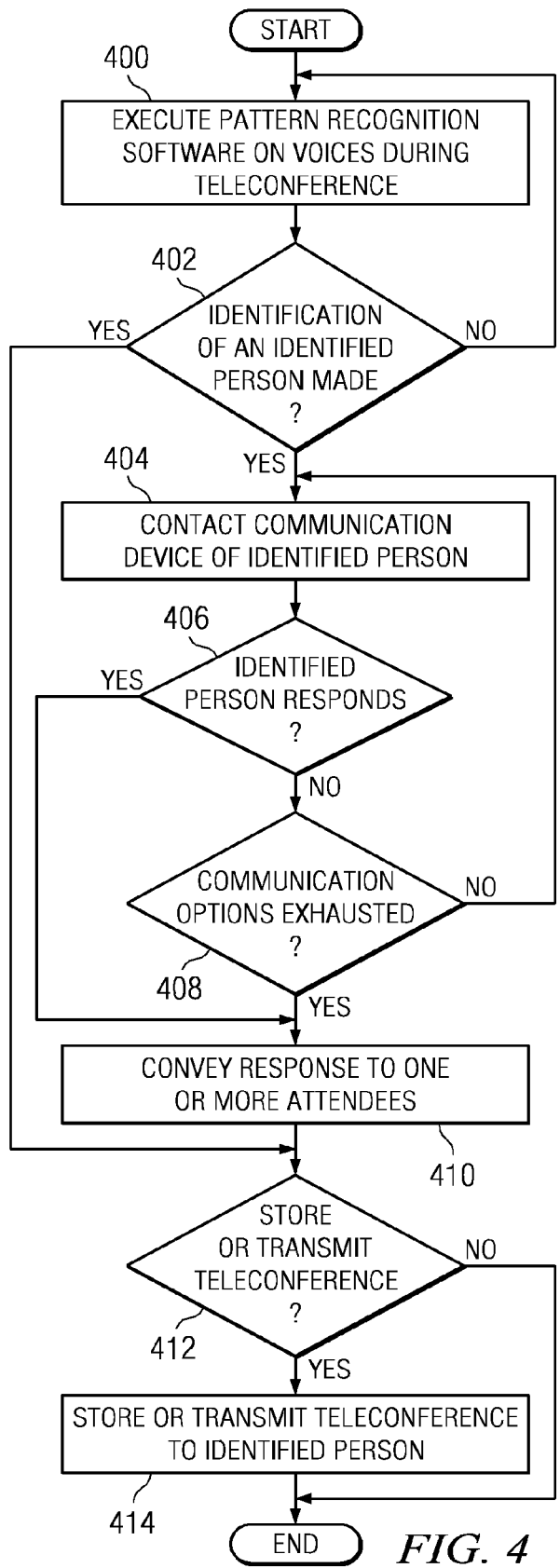
FIG. 4 is a flowchart of a process for contacting an identified person during a teleconference, in accordance with an illustrative embodiment of the present invention.

FIG. 4 is a flowchart of a process for contacting an identified person during a teleconference, in accordance with an illustrative embodiment of the present invention. The process shown in FIG. 4 can be implemented in a data processing system, such as server 102 or server 104, or client 110, client 112, or client 114 shown in FIG. 1, or data processing system 200 shown in FIG. 2. The process shown in FIG. 4 can be implemented using the devices described with respect to FIG. 3. In particular, the process shown in FIG. 4 can be implemented using a server, such as server 300 in FIG. 3, which monitors a teleconference.

The process begins as a server executes pattern recognition software on voices during a teleconference (step 400). The pattern recognition software executing on the server then determines whether an identification of an identified person has been made (step 402). As described above, an identified person is an individual that may be interested in the teleconference, may be a desired participant of the teleconference, may be a desired monitor of the teleconference, or may be required at the teleconference.

If identification of the identified person has not been made, (a no determination to step 402), then the process returns to step 400 and repeats. Otherwise, (a yes determination to step 402), the process possibly splits along two different paths. Along one path, the process possibly proceeds to step 412, possibly in parallel with step 404. In any case, the server contacts a communication device of the identified person (step 404).

The server then determines whether the identified person responds (step 406). If the identified person does not respond, (a no determination to step 406), then the server determines whether communication options have been exhausted (step 408). Communication options are considered exhausted when all methods of communicating with the identified person have been tried and failed. If the communication options have not been exhausted, (a no determination to step 408), then the process returns to step 404 and repeats. Otherwise, (a yes determination to step 408), or in response to a yes determination at step 406, the server conveys a response to one or more attendees of the teleconference (step 410).

The server then determines whether to store or transmit the teleconference (step 412). This step can also occur simultaneously after identification of the identified person has been made. In this way, the identified person will not miss out on portions of the teleconference that occur while server 300 is attempting to contact the identified person.

If the server is to store of transmit the teleconference, (a yes determination to step 412), then the server stores a recording or transcription of the teleconference and transmits recording or transcription to the identified person (step 414). The process then terminates. The process also terminates if the server is not to store and transmit the teleconference, (a no determination to step 412).

Figure 5:
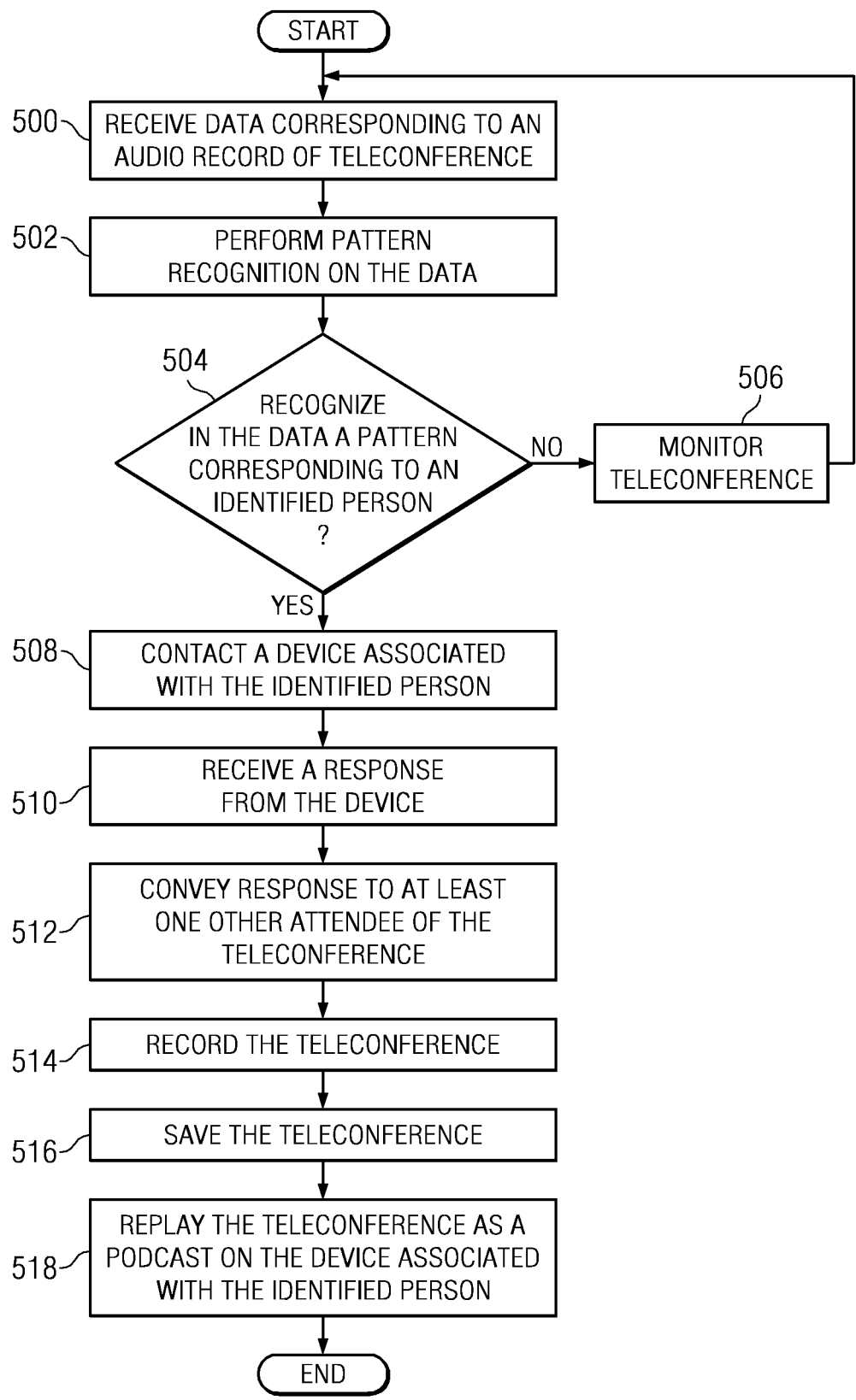
FIG. 5 is a flowchart of a process for contacting an identified person during a teleconference, in accordance with an illustrative embodiment of the present invention.

FIG. 5 is a flowchart of a process for contacting an identified person during a teleconference, in accordance with an illustrative embodiment of the present invention. The process shown in FIG. 5 can be implemented in a data processing system such as server 102 or server 104, or client 110, client 112, or client 114 shown in FIG. 1, or data processing system 200 shown in FIG. 2. The process shown in FIG. 5 can be implemented using the devices described with respect to FIG. 3. In particular, the process shown in FIG. 5 can be implemented using a server, such as server 300 in FIG. 3, which monitors a teleconference.

The process begins as the server receives data corresponding to an audio record of the teleconference (step 500). The server then performs pattern recognition on the data (step 502). The server then determines whether recognition is made in the data of a pattern corresponding to an identified person (step 504).

In the case of a no determination to step 504, the server continues to monitor the teleconference (step 506). The process then returns to step 500 and repeats.

In response to a yes determination at step 504, that is, a pattern corresponding to an identified person is recognized in the data, the server contacts a device associated with the identified person (step 508). The server then receives a response from the device (step 510). The response is related to the audio record. The term "related to the audio record" means that the response is in some way concerned with the subject matter presented in the audio record, or is in some way concerned with the audio record's existence or with the computer file or files that makes up audio. In any case, the server conveys the response to a second device associated with at least one other attendee of the teleconference (step 512). The term "second device" means a device that is different than the first device. A second device may be associated with the at least one other attendee, in the same manner that the first device is associated with the identified person. However, in another illustrative embodiment of the present invention, a second device may be associated with a person who is not participating in, or involved with, the teleconference. Thus, the entire process of recognizing an identified person, contacting the identified person, receiving a response, and conveying the response to a second person could all take place without the knowledge of one or more conference attendees. This feature would be useful, for example, in the embodiment of a customer service call in which a customer mentions a term such as "manager." In this case, the server recognizes that the term "manager" has been spoken. The server then informs a manager that his or her attention is required on the call, but without informing the customer service representative, the customer, or both that the manager has been notified.

In an illustrative embodiment of the present invention, the response can be a message recorded prior to initiation of the teleconference. This embodiment allows a user who expects to be mentioned during the teleconference to provide a prerecorded message to be played upon mention of the identified person's, or upon the mention of some other pre-determined passcode or identification phrase. In this case, and the identified person need not join the teleconference. In contrast, in an other illustrative embodiment of the present invention, contacting, receiving, and conveying are all performed during the teleconference.

Returning to FIG. 5, the server then records the teleconference (step 514). Additionally, the server saves the teleconference (step 516), and then replays the teleconference as a podcast on the device associated with the identified person (step 518). The process terminates thereafter.

The illustrative embodiments of the present invention provide for a computer-implemented method, computer program product, and data processing system for notifying an identified person of a teleconference. Data corresponding to an audio record of the teleconference is received. Pattern recognition is performed on the data. Responsive to recognizing in the data a pattern or tag words corresponding to an identification of the identified person, a device associated with the identified person is contacted.

Embodiments of the present invention may be implemented entirely in hardware, entirely in software or using a combination of both hardware and software elements. In one embodiment, the invention is implemented in software, including but not being limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium is any tangible apparatus that can contain or store the program for use by or in connection with the instruction execution system, apparatus, or device.

The medium is an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a communication medium (e.g., a system bus). The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer-implemented method for notifying an identified person of a teleconference, the computer-implemented method comprising:
    receiving, at a processor, data corresponding to an audio record of the teleconference;
    performing, using the processor, pattern recognition on the data, wherein the pattern recognition responds to tag words corresponding to an identification of the identified person;
    responsive to recognizing the tag words in the data, contacting a second device associated with the identified person, wherein contacting is performed by a first device in communication with the processor;
    receiving, at the processor, a response from the second device, wherein the response is related to the audio record;
    conveying the response to a third device using the first device, wherein the third device is associated with a person that is not participating in the teleconference;
    recording the teleconference using a recording device;
    saving the teleconference as a podcast onto a computer readable storage medium, wherein receiving data, performing, contacting, receiving a response, conveying, recording, and saving are all performed during the teleconference; and
    replaying the podcast to the identified person on the third device in real time as the teleconference is conducted.

2. The computer-implemented method of claim 1 wherein contacting comprises at least one of transmitting an instant message to an instant message address associated with the identified person, transmitting an email to an email address associated with the identified person, transmitting a text message to a mobile communication device associated with the identified person, and calling a telephone number associated with the identified person.

3. The computer-implemented method of claim 1 wherein the response comprises at least one of joining the teleconference, transmitting an instant message containing an indicated response, transmitting an email containing an indicated response, transmitting a text message containing an indicated response from a mobile communication device, transmitting an audio message from a communication device, transmitting an indication that the identified person will be late, and transmitting an indication that the identified person will not attend the meeting.

4. The computer-implemented method of claim 1 wherein the computer-implemented method is performed by a server having installed thereon speech pattern recognition software, wherein the server is connected to a network over which the teleconference is being held.

5. The computer-implemented method of claim 1, wherein the method is executed without of one or more teleconference attendees being aware that the method has been executed.

6. The computer-implemented method of claim 1 wherein the response comprises transmitting a message recorded prior to initiation of the teleconference that the identified person will not join the teleconference.

7. A non-transitory computer readable storage medium containing instructions for notifying an identified person of a teleconference, the instructions comprising:
    instructions for receiving, at a processor, data corresponding to an audio record of the teleconference;
    instructions for performing, using the processor, pattern recognition on the data, wherein the pattern recognition responds to tag words corresponding to an identification of the identified person;
    instructions for, responsive to recognizing the tag words in the data, contacting a second device associated with the identified person, wherein contacting is performed by a first device in communication with the processor;
    instructions for receiving, at the processor, a response from the second device, wherein the response is related to the audio record;
    instructions for conveying the response to a third device using the first device, wherein the third device is associated with one of: another attendee of the teleconference and a person that is not participating in the teleconference;
    instructions for recording the teleconference using a recording device;
    instructions for saving the teleconference as a podcast onto a computer readable storage medium, wherein receiving data, performing, contacting, receiving a response, conveying, recording, and saving are all performed during the teleconference; and
    instructions for replaying the podcast to the identified person on the third device in real time as the teleconference is conducted.

8. The computer non-transitory readable storage medium of claim 7, further comprising:
    instructions for performing all instructions of claim 7 without of one or more teleconference attendees being aware that any instructions of claim 7 have been executed.

9. The non-transitory computer readable storage medium of claim 7 wherein the response comprises transmitting a message recorded prior to initiation of the teleconference that the identified person will not join the teleconference.

10. A data processing system comprising:
    a bus;
    a communications unit coupled to the bus;
    a memory coupled to the bus, wherein the memory contains a set of instructions for notifying an identified person of a teleconference;
    a processor coupled to the bus, wherein the processor is capable of executing the set of instructions to:

receive, at the processor, data corresponding to an audio record of the teleconference;

perform, using the processor, pattern recognition on the data, wherein the pattern recognition responds to tag words corresponding to an identification of the identified person;

responsive to recognizing the tag words in the data, contact a second device associated with the identified person, wherein contacting is performed by a first device in communication with the processor;

receive, at the processor, a response from the second device, wherein the response is related to the audio record;

convey the response to a third device using the first device, wherein the third device is associated with one of: another attendee of the teleconference and a person that is not participating in the teleconference;

record the teleconference using a recording device;

save the teleconference as a podcast onto a computer readable storage medium, wherein receiving data, performing, contacting, receiving a response, conveying, recording, and saving are all performed during the teleconference; and instructions for replaying the podcast to the identified person on the third device in real time as the teleconference is conducted.

11. The data processing system of claim 10, wherein the processor is configured to execute the set of instructions to:

perform all instructions of claim 10 without of one or more teleconference attendees being aware that any instructions of claim 10 have been executed.

12. The data processing system of claim 10 wherein the response comprises transmitting a message recorded prior to initiation of the teleconference that the identified person will not join the teleconference.

13. A computer-implemented method for notifying an identified person of a teleconference, the computer-implemented method comprising:

receiving, at a processor, data corresponding to an audio record of the teleconference;

performing, using the processor, pattern recognition on the data, wherein the pattern recognition responds to tag words corresponding to an identification of the identified person;

responsive to recognizing the tag words in the data, contacting a second device associated with the identified person, wherein contacting is performed by a first device in communication with the processor, and wherein contacting further comprises at least one of transmitting an instant message to an instant message address associated with the identified person, transmitting an email to an email address associated with the identified person, transmitting a text message to a mobile communication device associated with the identified person, and calling a telephone number associated with the identified person;

responsive to recognizing a name of the identified person more than a predetermined number of times, attempting to contact the identified person via different methods on additional devices in a particular priority;

receiving, at the processor, a response from one of the additional devices, wherein the response is related to the audio record, wherein the response comprises at least one of joining the teleconference, transmitting an instant message containing an indicated response, transmitting an email containing an indicated response, transmitting a text message containing an indicated response from a mobile communication device, transmitting an audio message from a communication device, transmitting an indication that the identified person will be late, and transmitting an indication that the identified person will not attend the meeting;

conveying the response to a third device using the first device, wherein the third device is associated with a person that is not participating in the teleconference;

receiving, at the processor, a second response comprising a pre-recorded message to be played during the teleconference upon mention of the identified person, or upon mention of a pre-determined identification phrase;

recording the teleconference using a recording device;

responsive to receiving a mention of the identified person or upon mention of the pre-determined identification phrase, playing the pre-recorded message during the teleconference;

saving the teleconference as a podcast onto a computer readable storage medium, wherein receiving data, performing, contacting, receiving a response, conveying, recording, and saving are all performed during the teleconference; and replaying the podcast to the identified person on the third device in real time as the teleconference is conducted;

wherein the computer-implemented method is performed by a server having installed thereon speech pattern recognition software, wherein the server is connected to a network over which the teleconference is being held, and wherein the method is executed without of one or more teleconference attendees being aware that the method has been executed.

* * * * *